United States Patent [19]
Nunokawa et al.

[11] Patent Number: 6,053,001
[45] Date of Patent: Apr. 25, 2000

[54] CONTROLLER OF AIR CONDITIONER

[75] Inventors: Hiroyuki Nunokawa, Ohta; Kazuhito Fujinaka, Ohra-gun; Manabu Ishihara, Isesaki; Tomonori Isobe, Kumagaya; Hiroshi Hirose, Ohta; Junichi Matsuoka, Kumagaya; Toru Fujisawa; Tsugio Nakae, both of Ohra-gun, all of Japan

[73] Assignee: Sanyo Electric Co., Ltd., Osaka, Japan

[21] Appl. No.: 09/065,039

[22] PCT Filed: Aug. 25, 1997

[86] PCT No.: PCT/JP97/02937

§ 371 Date: Apr. 27, 1998

§ 102(e) Date: Apr. 27, 1998

[87] PCT Pub. No.: WO98/09116

PCT Pub. Date: Mar. 5, 1998

[30] Foreign Application Priority Data

Aug. 27, 1996 [JP] Japan ................................. 8-225574

[51] Int. Cl.[7] .................................................. F24F 11/02
[52] U.S. Cl. ............................ 62/230; 62/228.4; 236/51; 307/39
[58] Field of Search ................................. 62/230, 175, 229, 62/228.4; 236/51; 307/31, 32, 38, 39, 40, 35

[56] References Cited

U.S. PATENT DOCUMENTS

| 5,207,071 | 5/1993 | Ozu et al. | 62/230 X |
| 5,390,206 | 2/1995 | Rein et al. | 236/51 X |
| 5,462,225 | 10/1995 | Massara et al. | 307/39 X |
| 5,595,342 | 1/1997 | McNair et al. | 236/51 |

*Primary Examiner*—Harry B. Tanner
*Attorney, Agent, or Firm*—Wenderoth, Lind & Ponack, L.L.P.

[57] ABSTRACT

There is provided a demand control apparatus which is less attenuated in the wall and which can be installed even after the completion of construction of a new house. The present invention comprises a demand control unit for converting a restriction signal for restricting an electric current flowing to a circuit breaker so as not to exceed a target current value into a radio signal composed of a predetermined format and then transmitting the same, and a control unit for performing a modification in a way to reduce power consumption of the air conditioner when the restriction signal from the demand control unit is judged to be effective to coincide with the format.

11 Claims, 8 Drawing Sheets

CONTROLLER OF AIR CONDITIONER

TECHNICAL FIELD OF THE INVENTION

This invention relates to a control apparatus for controlling a total amount of the power consumption by decreasing an ability of the operation of an air conditioner so that total power will not exceed a predetermined value, when power of home use is increased.

BACKGROUND OF THE INVENTION

Typical control apparatuses of the type mentioned above, called demand controllers, for example, are disclosed in Japanese Patent Unexamined Publication (KOKAI) Nos. 5-164376/93, 7-55225/95, and 5-95629/93. The control apparatuses disclosed in these publications are all constructed such that a signal requesting a demand (reduction of power) is supplied to an air conditioner from the control apparatus through a wire or line.

In case a signal requesting a demand is supplied to an air conditioner through a line, the work for wiring a signal line is accompanied. In consideration of an outward appearance of the wiring, it is customary that such a signal line is wired while the work for constructing a new house is undergoing, and it is rare that a demand control apparatus is installed after the completion of construction of a new house and installation of the demand control apparatus after the new house is completed is prohibited.

In view of the above problem, the present invention provides a control apparatus like a demand controller which can be installed after a completion of construction of a new house, in which a radio wave communication hardly attenuated in the wall and an infrared signal capable of easily communicating with an air conditioner without a need of a provision of any additional device are used in combination.

DISCLOSURE OF THE INVENTION

According to the present invention, there is provided an apparatus for controlling an air conditioner capable of obtaining power from at least one of a plurality of power delivery lines connected to an individual circuit breaker, wherein the apparatus comprises a demand control unit for converting a restriction signal for restricting an electric current flowing to the circuit breaker so as not to exceed a target current value into a radio signal composed of a predetermined format and then transmitting the same, and a control unit for performing a modification in a way to reduce power consumption of the air conditioner when the restriction signal from the demand control unit is judged to be effective due to a coincidence of the format.

With the above-mentioned construction, there can be obtained a control apparatus of a demand control without a need of a provision of a signal line.

In another aspect of the invention, there is also provided an apparatus for controlling an air conditioner capable of obtaining power from at least one of a plurality of power delivery lines connected to an individual circuit breaker, wherein the apparatus comprises a demand control unit for converting a restriction signal for restricting an electric current flowing to the circuit breaker so as not to exceed a target current value, into a radio signal composed of a predetermined format and then transmitting the same, a restriction signal converter for converting the restriction signal from the demand control unit into an infrared signal and transmitting the same when the restriction signal from the demand control unit is judge to be effective due to a coincidence of the format, a remote controller for transmitting a drive signal for controlling operation of the air conditioner with use of an infrared signal, and a control unit for performing a modification with respect to the signal from the restriction signal converter in a way to reduce power consumption of the air conditioner by judging the infrared signal transmitted from the remote controller and the infrared signal transmitted from the restriction signal converter both to be effective.

With the above-mentioned construction, it becomes possible to control the air conditioner by interrupting into the signal from the remote controller of the air conditioner without a need of a provision of a signal line.

In a further aspect of the present invention, there is also provided an apparatus for controlling an air conditioner capable of obtaining power from at least one of a plurality of power delivery lines connected to an individual circuit breaker and varying an air conditioning ability in accordance with a load of a room to be air conditioned, wherein the apparatus comprises a demand control unit for converting a first restriction signal when a current flowing to the circuit breaker exceeds a first target current value but does not exceeds a second target current value, a second restriction signal when the current exceeds the second target current value but does not exceeds a third target current value, and a third restriction signal when the current exceeds a third target current value, respectively into radio signals each based on a predetermined format and then transmitting the same. Further, the controlling apparatus comprises a restriction signal converter for converting the first to third restriction signals from the demand control unit respectively into infrared signals and transmitting the same when the first to third restriction signals from the demand control unit are judged to be effective due to a coincidence of the format, a controller for transmitting a drive signal for controlling operation of the air conditioner with use of an infrared signal, and a control unit for performing a modification with respect to the first restriction signal from the restriction signal converter in a way to restrain an increase of power consumption by restraining an increase of air conditioning ability of the air conditioner, with respect to the second restriction signal from the restriction signal converter in a way to reduce power consumption by decreasing an air conditioning ability of the air conditioner, and with respect to the third restriction signal from the restriction signal converter in a way to reduce power consumption by stopping an air conditioning operation of the air conditioner.

With the above-mentioned construction, it becomes possible to restrain/reduce powder consumption of the air conditioner and stop an air conditioning operation with an output of a demand signal which was interrupted into a signal from the remote controller.

In a still further aspect of the present invention, there is provided an apparatus for controlling an air conditioner capable of obtaining power from at least one of a plurality of power delivery lines connected to an individual circuit breaker, performing an cooling/heating/defrosting operation and varying an air conditioning ability in accordance with a load of a room to be air conditioned, wherein the apparatus comprises a demand control unit for converting a first restriction signal when a current flowing to the circuit breaker exceeds a first target current value but does not exceeds a second target current value, a second restriction signal when the current exceeds the second target current value but does not exceeds a third target current value, and a third restriction signal when the current exceeds a third target current value, respectively into radio signals each composed of a predetermined format and the transmitting the same. Further, the controlling apparatus comprises a restriction signal converter for converting the first to third restriction signals from the demand control unit respectively into infrared signals and transmitting the same when the first to third restriction signals from the demand control unit are judged to be effective due to a coincidence of the format, a remote controller for transmitting a drive signal for controlling an operation of the air conditioner with use of an infrared signal, a control unit for performing a modification with respect to the first restriction signal from the restriction signal converter in a way to restrain an increase of power consumption by restraining increase of an air conditioning ability of the air conditioner, with respect to the second restriction signal from the restriction signal converter in a way to reduce power consumption by decreasing an air conditioning ability of the air conditioner, and with respect to the third restriction signal from the restriction signal converter in a way to reduce power consumption by stopping an air conditioning operation of the air conditioner, and a defrost modification unit for modifying conditions of a start of a defrosting operation so that the air conditioner can easily resume the defrosting operation, at the time of resuming operation of the air conditioner when the air conditioner has stopped the defrosting operation based on one of the first to third restriction signals.

With the above-mentioned construction, the air conditioner can easily resume (or begin again) a defrosting operation after the operation of the air conditioner is resumed when the air conditioner has stopped the defrosting operation by demand control.

In a further aspect of the invention, there is provided an apparatus for controlling an air conditioner, the apparatus has a parent (main) machine provided with the demand control unit, and a child (branch) machine provided with the restriction signal converter. The parent machine is placed in a location in the vicinity of the individual circuit breaker and the child machine is placed in a location capable of receiving a radio signal from the parent machine and capable of transmitting an infrared signal to the air conditioner.

With this structure, there can be obtained a control apparatus of a demand control which permits a reliable transmission of the signal to the air conditioner, without a provision of a signal line.

In a further aspect of the invention, there is provided an apparatus for controlling an air conditioner, the demand control unit converts a cancellation signal to a radio signal composed of a predetermined format and transmits the same when a current value of the current flowing to the circuit breaker becomes smaller than the first target current value after the restriction signal is output, the restriction signal converter converts the cancellation signal to an infrared signal and transmits the same when the cancellation signal from the demand control unit is judged to be effective due to a coincidence of the format, and the control unit judges that the infrared signal transmitted from the restriction signal converter to be effective, and cancels the modification of the operation ability of the air conditioner based on the restriction signal so that the operation mode will return to normal.

With this structure, the operational state of the air conditioner based upon the demand signal can be shifted immediately to the normal operational state.

In a further aspect of the invention, there is provided an apparatus for controlling an air conditioner, wherein when a current value of the current flowing to the circuit breaker varies serving the second target current value as a boarder, the operation ability of the air conditioner is maintained in the modified state based on the second restriction signal, and when the current value of the current flowing to the circuit breaker varies serving the first target current value as a boarder, the operation ability of the air conditioner is maintained in the modified state based on the first restriction signal.

With this structure, even when the current value varies so often from the target current value as a boarder, the restrictional state does not vary so often, with the result of attaining a reliable demand control.

PREFERRED EMBODIMENTS OF THE INVENTION

Figure 1:
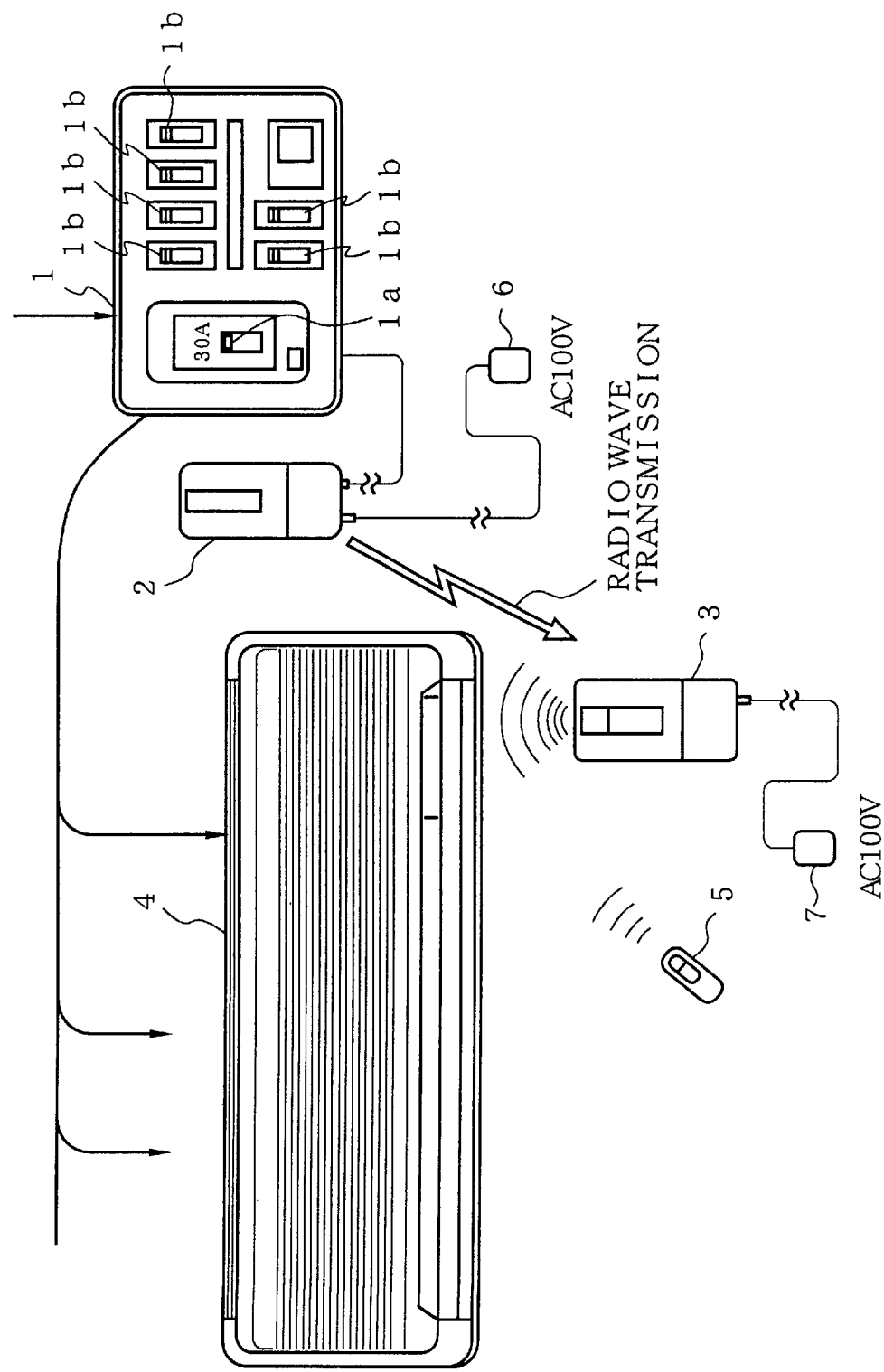
FIG. 1 is a schematic view of one embodiment of the present invention.

The embodiment of the present invention will be described hereinafter with reference to the drawing. In FIG. 1 which is a schematic view of an apparatus for controlling an air conditioner according to the present invention, a circuit breaker 1 is shown for indoor wiring of a residential house, and power is supplied to respective electrical appliances through a plurality of branch wires or lines.

The controlling apparatus has a parent machine (demand control unit) 2 for outputting a demand control signal, a child machine (restriction signal converter) 3 for converting a signal from the parent machine 3 to a signal for an air conditioner 4, and a remote controller 5 for actuating the air conditioner 4. Reference numerals 6, 7 denote adapters for supplying operational power respectively to the parent machine 2 and the child machine 3.

In such a construction as mentioned above, a room where the circuit breaker 1 is installed is usually different from a room where the air conditioner 4 is installed and there is a wall between the two rooms. A current value for actuating the circuit breaker 1 is 30A in FIG. 1. However, the present invention is not limited to this. A circuit breaker which is actuated by an increased current value, such as, 50A, 60A, or the like is also acceptable. Symbolic reference numeral 1a denotes a return switch of a main breaker, and 1b, a return switch of a breaker provided on a branch line.

The parent machine 2 is, roughly, functioned to detect a current flowing to the circuit breaker 1 and transmit a restriction signal (stop signal) for stopping the air conditioning operation of the air conditioner from a relation between the current thus detected and a set point of current, another restriction signal (ability down signal) for reducing the ability for operating the air conditioner, still another restriction signal (ability increase prohibit signal) for restraining increase of the ability for operating the air conditioner, and a signal (return signal) for canceling those restriction signals in PCM frequency modulated into a predetermined carrier frequency (for example, 309.7 MHz) by a signal composed based on a certain format.

The child machine 3 is, roughly, functioned to transmit a signal received from the parent machine 2 towards a light receiving unit of the air conditioner 4 by transforming the signal into an infrared signal of a format receivable by the air conditioner 4 after the signal is demodulated. Therefore, the child machine 3 is installed in a position where the air conditioner 4 can receive the infrared signal.

For the purposes of transmitting and receiving a signal between the parent machine 2 and the child machine, a general-use module such as AFW-J23 or WMF-R01 made by MITUMI Corp. can be used.

The remote controller 5 is, roughly, functioned to output several kinds of infrared signals for controlling the operation of the air conditioner 4. Those infrared signals are for start/stop of the air conditioner, timer mode operation (start/stop of air conditioning operation after a preset time), selection/change of preset temperature, setting of an amount of air to be blown (strong, medium, weak, automatic), selection of an operation mode (cooling, heating, dehumidifying, automatic), and the like. This remote controller is provided with a liquid crystal display unit for displaying such setting items as a preset temperature.

The infrared signals, which are transmitted from the child machine 3 and the remote controller 5 to the air conditioner 4, are each output in a predetermined format (for example, PCM signal obtained by modulating a carrier frequency of 38.5 kHz based on a predetermined format).

The air conditioner 4 is, roughly, functioned to control the air conditioning operation by obtaining signals from the remote controller 5 and the child machine 3. The air conditioner 4 comprises an ability variable means for varying the operation ability at least in a plurality of steps, control means for varying the operation ability based on a preset temperature and a room temperature and converging this operation ability to an ability in match with an air conditioning load, and other related control means.

It can be known as follows whether an infrared signal is transmitted from the child machine 3 or from the remote controller 5.

A format of each infrared signal includes a leader code indicating the start of the signal, data of a plurality of bytes indicating the control signal, and a stop bit indicating the end of the signal. In the control unit of the air conditioner, after receiving all receivable infrared signals (a series of signals composed based on the format) and demodulating the same, it is judged whether or not the length of data satisfies a predetermined length. If this condition is satisfied, it is judged (address coincidence judgment) whether or not the code of two (2) bytes located before the data is coincident with a predetermined code. If these codes are coincident, control is carried out based on the data following thereafter.

Presuming here is that the data of the infrared signal transmitted from the remote controller 4 has the length of sixteen (16) bytes and the data of the infrared signal transmitted from the child machine 3 has the length of ten (10) bytes, it can be determined, by checking the length of the respective data, whether the infrared signal comes from the remote controller 5 or from the child machine 3.

In the alternative, it is also acceptable that an address code for identification is provided on the transmitter side so that a judgment can be made based on this address code, or that exactly same forms are used so that a judgment can be made based on the value of this code.

Figure 2:
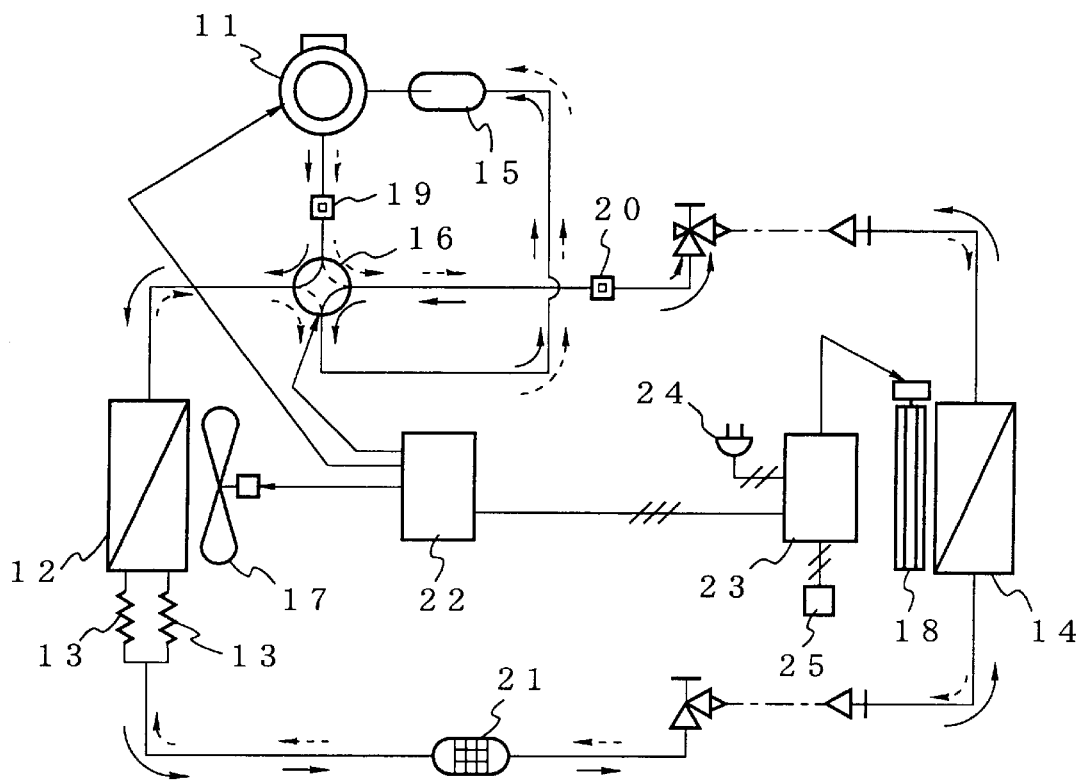
FIG. 2 is a schematic view of an air conditioner used in the embodiment of the present invention.

In FIG. 2 showing the air conditioner 4, the apparatus has a rotary type coolant compressor 11, a heater source side heat exchanger 12, an expansion device 13, a user side heat exchanger 14, an accumulator 15, and a four-way switch valve 16. When the four-way valve 16 is in the position indicated by the solid lines of FIG. 2, the refrigerant gas of high temperature and high pressure compressed by the compressor 11 is circulated in a direction as indicated by solid line arrows. That is, the refrigerant discharged from the compressor 11 is condensed by being blown by a blower (propeller fan) 17 in the heat source side heat exchanger 12. After reduction in pressure by the expansion device 13 (capillary tube, electric expansion valve, or the like), the refrigerant is evaporated by the user side heat exchanger 14. Air cooled by heat of vaporization caused by evaporation of this refrigerant is supplied to the room to be air conditioned by a blower (cross flow fan) 18. In this way, the cooling operation is performed in the room to be air conditioned. Then, after the refrigerant is separated into gas and vapor, only the gas refrigerant is drawn again into the compressor 11.

When the four-way valve 16 is in the position indicated by the dotted lines, the refrigerant gas of high temperature and high pressure is circulated in the direction as indicated by dotted line arrows. That is, the refrigerant discharged from the compressor 11 is condensed by the user side (room) heat exchanger 12. This condensed heat is blown into the room to be air conditioned by the blower 17. In this way, the heating operation is performed in the room to be air conditioned. Subsequently, after such a condensed refrigerant is reduced in pressure in the expansion device 13, it is evaporated by the heat source side heat exchanger 14. Then, after being separated into a gas and vapor by the accumulator 15, only the gas refrigerant is drawn again into the compressor 11. By driving the blower 18, evaporation of the refrigerant is enhanced.

When such a heating operation is continued in the winter season where an ambient temperature is low, frost is deposited on the heat source side heat exchanger, as a result of which evaporation efficiency (heat absorption efficiency) of the heat source side heat exchanger is degraded, thus making it unable to exhibit sufficient heating ability.

Therefore, normally, when an amount of deposition of frost on the heat source side heat exchanger is increased, the cooling cycle is switched to a cooling operation mode and the heat source side heat exchanger serves as a condenser so that the frost deposited on the heat source side heat exchanger is melted by its condensing heat. The start of this defrosting operation can be determined by various methods such as, for example, a method for determining a decrease of an ability of the cooling cycle based on a change in temperature of the evaporator, the condenser, or the like. At that time, in order to prevent the heating operation to be interrupted due to frequent occurrence of the defrosting operation, a predetermined time interval may be provided. The end of the defrosting operation is the time when the temperature of the heat source side heat exchanger becomes a predetermined temperature or more, or when defrosting operation is carried out for a predetermined time.

In FIG. 2 of the drawing, reference numerals 19, 20 denote mufflers, and 21, a modulator for cleaning dust in the refrigerant, respectively.

Similar, reference numerals 22 and 23 denote a heat source side control unit and a room side control unit, respectively. The control units 22, 23 are connected through a signal line so that data can be delivered therebetween.

The heat source side control unit 22 includes at least a control unit for controlling the speed of rotation of the compressor 11. For example, in case the means for actuating the rotation of the compressor 11 is an induction motor, a control unit of the type in which the speed of rotation of the compressor is controlled by varying the frequency of alternating current power to be supplied to the induction motor, or in case the means for actuating the rotation of the compressor 11 is a direct current motor, a control unit of the type in which the speed of rotation of the compressor is controlled by varying the direct current voltage to be supplied to the direct current motor. By controlling the speed of rotation of the compressor 11 through the control unit 22, an amount of the refrigerant circulating in the cooling cycle is varied, so that the air conditioning ability of the air conditioner can be controlled.

The signal (signal for increasing/decreasing the speed of rotation) for determining the speed of rotation of the compressor 11 is provided from the control unit 23 through a signal line.

The heat source side control unit 22 further includes means for controlling the operation of the blower 17 and the four-way valve 16.

The user side control unit 23 includes a plug 24 for obtaining power from at least one of a plurality of power source lines (branch lines of indoor wiring) connected to a current breaker, and a light receiving unit 25 for receiving an infrared signal. In the user side control unit 23, the speed of rotation of the compressor 11 is calculated based on the control signal received by the light receiving unit 25, and the speed of rotation thus calculated is transmitted to the heat source side control unit 22, or the operation of the blower 18 is controlled.

As a method for calculating the speed of rotation (for example, in case an induction motor is employed, the frequency) of the compressor 11, a difference between a preset temperature transmitted from the remote controller 5 for every predetermined cycle (for example, every 30 seconds) and the room temperature (the temperature of the room to be air conditioned), as well as a variation of this difference, for example, is input to execute a preliminarily tuned fuzzy operation to obtain an increased/decreased portion in frequency with respect to the current frequency and then to calculate a new target frequency. In case a direct current motor is employed, this frequency is converted to a value of a corresponding speed of rotation, and the speed of rotation is controlled such that the compressor 11 is rotated at this speed of rotation. In case the speed of rotation of the compressor 11 is controlled in this way, when the rotation of the compressor 11 is increased, an amount of the refrigerant circulating in the cooling cycle is increased. That is, the cooling ability is increased to increase the power consumption in the compressor 11. On the other hand, when the speed of rotation of the compressor 11 is decreased, an amount of the refrigerant circulating in the cooling cycle is decreased, as a result of which the cooling ability is decreased to decrease the power consumption of the compressor 11.

Figure 3:
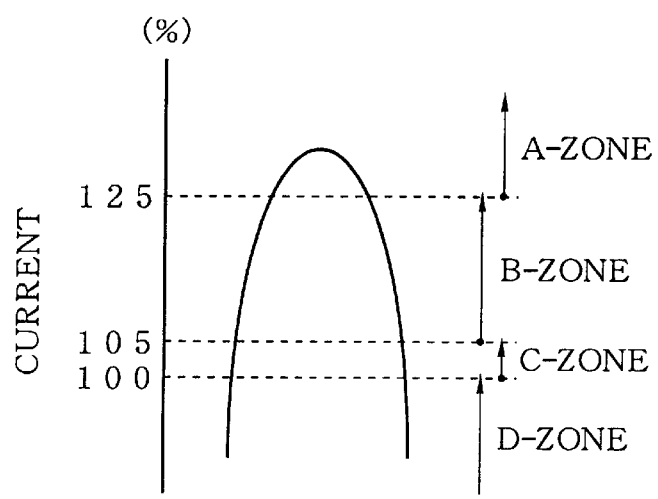
FIG. 3 is an explanatory view showing an operation based on a current detected by a parent machine.

FIG. 3 is an explanatory view showing an operation of the parent machine 2 based on a current detected. A-zone to D-zone are such zones (ranges) that can be obtained by dividing at 105% (second target value) and 125% (third target value) of a set point when the set point of current is 100% (first target value). The A-zone occupies a range where the current is 125% or more of the set point, the B-zone occupies a range where the set point of current is 105% or more but less than 125%, the C-zone occupies a range where the current is 100% or more of the set point of current but less than 105%, and the D-zone occupies a range where the current is less than 100%.

Although each zone is set to a zone more than 100%, since operation of the circuit breaker to be controlled is not very tight, if the current is decreased by outputting a restriction signal during that time, the air conditioner can normally be operated in its maximum capacity. For example, the circuit breaker is actuated to cut off current when a 130% of the set point is maintained for three (3) minutes.

In the A-zone, a signal (frequency=0) for stopping the compressor 11 is output, in the B-zone, a signal (signal for decreasing the frequency) for decreasing the operating ability of the compressor 11 is output, in the C-zone, a signal (signal for prohibiting increase of the frequency) for prohibiting the increase of the operating ability of the compressor 11 is output, and in the D-zone, a signal for canceling the restrictions made in the A-zone, the B-zone, and the C-zone is output.

The set current is selected from, for example, 20A, 30A, 40A, and 50A. It should be noted, however, that the set current is not limited to one of those values but it can be changed as desired. Three (3) LEDs for monitoring current are linearly arranged on the parent machine 2. When the detected current is 50% or less of the set current, one of the three LEDs is turned on, when the detected current is 80% or less of the set current, two of the three LEDs are turned on, and when the detected current is more than 80%, the three LEDs are turned on, all in a bar-graph fashion. The lighting system of those LEDs may be either a static system or a dynamic system. A suitable system may be selected in match with the construction of the control apparatus.

As a current detector, a clamp type C.T. (current transformer which can be attached with a current line clamped therebetween) is used. For example, CTL-9-S50-20T-CL manufactured by Kabushiki Kaisha U. R. D., or an equivalent thereof, or any other equivalent device capable of detecting an alternating current can be used.

Figure 4:
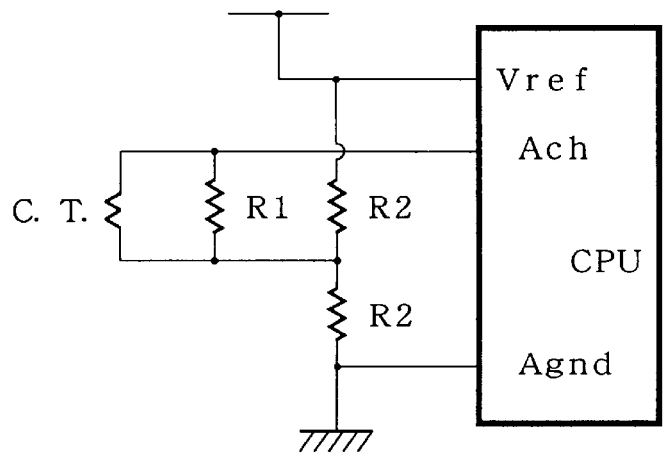
FIG. 4 is a diagram showing an example of an electric circuit used of or detecting a current.

FIG. 4 shows one example of an electric circuit for use of detecting current. In this circuit, reference character C.T. denotes the above-mentioned current detector which is connected to a terminal Ach of a personal computer CPU through an output resistor R1. Resistors R2, R2 are for clamping and have the same value. If a power source voltage Vref is 5 V, an output of the current detector C.T. varies somewhere around 2.5 V (5 V×½).

The personal computer CPU takes this voltage therein at every 500 ns after the voltage is converted from analog to digital. Thereafter, the following calculation is made to obtain an effective value of the current and the effective value thus obtained is used for the above-mentioned control.

$$I = \sqrt{\frac{1}{2\pi}\int_0^{2\pi}(i)^2 d\theta} \qquad \text{[Equation 1]}$$

In the above equation, I represents an effective value of current obtained by calculation and is a value of a square root obtained by multiplying an integral value of two squares of an current value for one cycle portion by ½π.

For example, the calculation is made serving the least common multiple cycle 100 msec. of 50 Hz and 60 Hz as one unit in order to be commonly used in 50 Hz and 60 Hz of alternating current. If current is detected at every 500 μs, 200 times sampling can be made.

Therefore, a voltage supplied to the terminal Ach by causing a time interrupt to occur at every 500 μs is read with a predetermined resolution (for example, 9 bits) and converted to a current i. Thereafter, the value of this current i is squared by itself and integrated in a buffer (memory unit). When the number of times of integration reaches 200, the value integrated in the buffer is divided by 200 and then, a square root of that value is obtained. The square root can be calculated by a known method such as Newton-Raphson method.

Since the ability restriction control as described above is performed with respect to the compressor 11 using the current effective value I thus obtained, such an ability restriction control is performed substantially at every 200 msec.

It is also acceptable that the cycle to perform the control is increased by increasing the cycle of one unit to a multiple number of 100 msec., for example, 200 msec., 300 msec., 400 msec., and so on. In this case, since the number of integration is increased such as 400 times, 600 times, and so on, it is necessary to coincide the capacity of the buffer and the number of times for division.

The reason why the restricting is made by obtaining an effective value of the current is to detect a correct current value even when the waveform of the current to be detected is greatly deformed from a sign wave.

FIGS. 5, 6, 7 and 8 are flow charts showing an operation for outputting a restriction signal in accordance with a current flowing to the circuit breaker. In those flow charts, two child machines are provided. One of the two child machines is a normal child machine (lower machine), while the other is a child machine (higher machine) having a higher order of priority. That is, the higher machine is more difficult to be restricted in operation than the lower machine. The lower machine and the higher machine can be identified one from the other by assigning an identification mark to the restriction signals to be transmitted from the parent machine to the lower machine and the higher machine.

Figure 5:
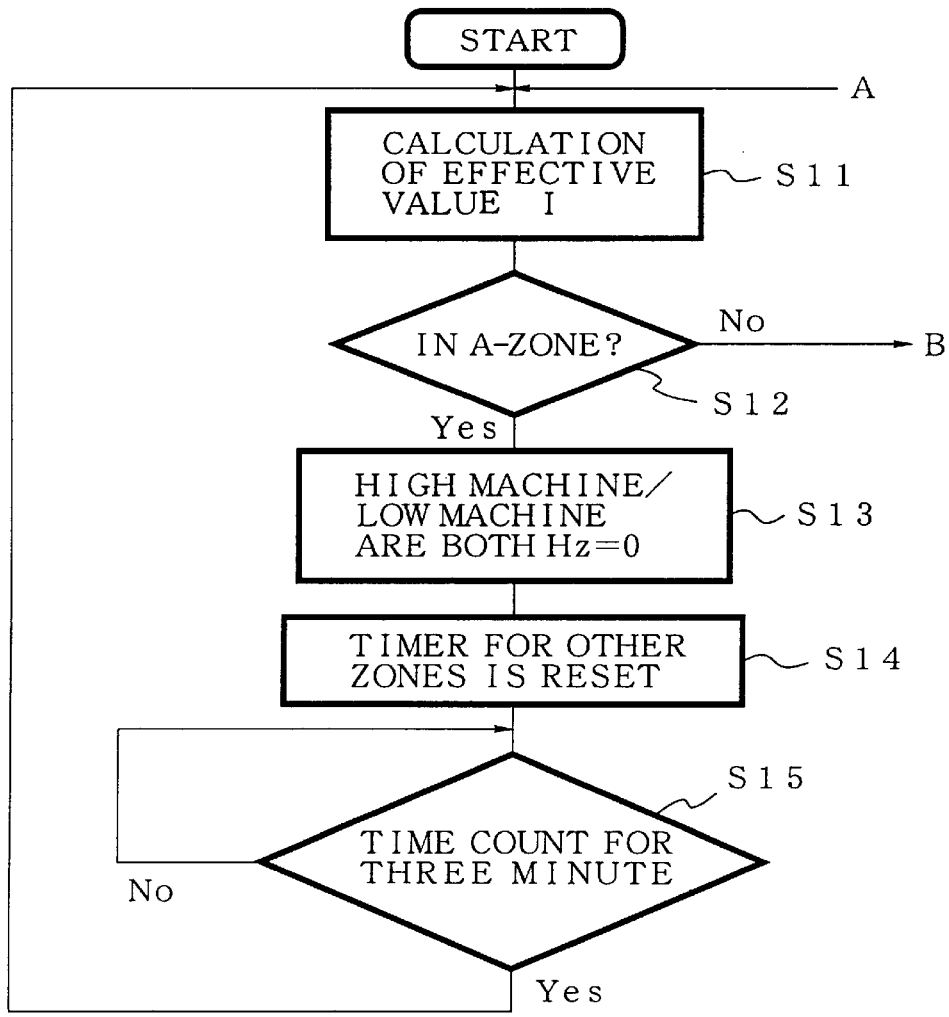
FIG. 5 is a flow chart of an operational mode showing an operation for outputting a restriction signal in accordance with a current flowing to a circuit breaker.

In FIG. 5, the current effective value I is calculated in step S11. Since this calculation is made at every predetermined cycle such as every 100 msec., or 200 msec., the following flow charts are executed substantially at every predetermined cycle mentioned above.

When the current effective value I is obtained, first, it is judged in step S12 whether or not the effective value I is in the A-zone. If the effective value I is in the A-zone, the process proceeds to step S13 where restriction signals for making the frequency Hz to zero (0) are transmitted to the higher machine and the lower machine. That is, the air conditioner associated with the lower machine and the air conditioner associated with the higher machine are both stopped in operation.

At the same time, the timer used in other zones is reset. Such a stop operation state of the air conditioner is maintained for three minutes in step S15. It should be noted that this time is not limited to three minutes, but it can be set as desired.

Figure 6:
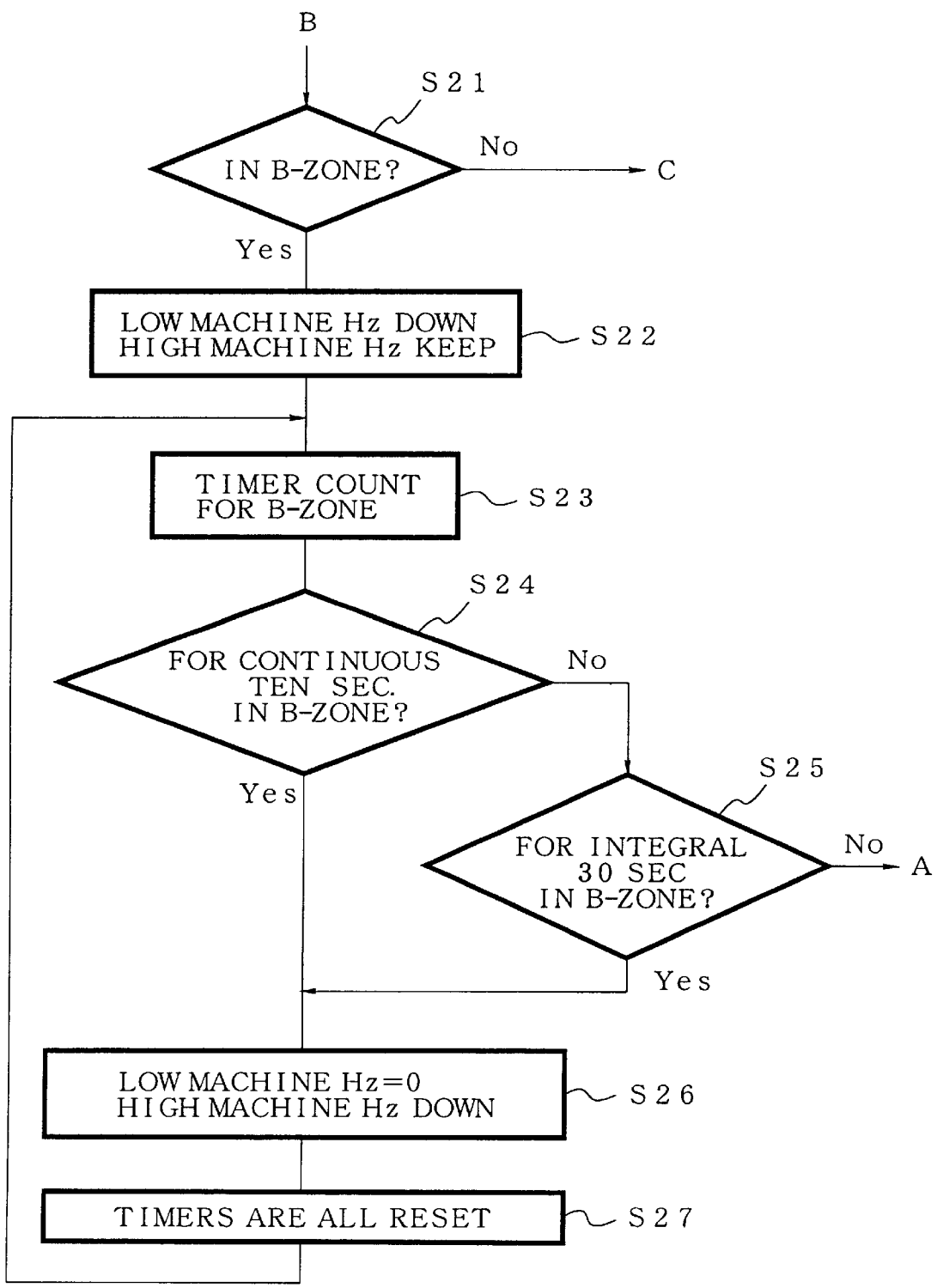
FIG. 6 is a flow chart showing an operation for outputting a restriction signal in accordance with a current flowing to a circuit breaker.

If the current effective value I is not in the A-zone in step S12, the process proceeds to step S21 of FIG. 6 where it is judged whether or not the current effective value I is in the B-zone. If the effective value I is in the B-zone, a signal for decreasing the operation ability Hz is output to the lower machine and a signal (signal for maintaining the operation ability Hz) for restraining the increase of operation ability Hz is output to the higher machine in step S22.

The current operation frequency of the air conditioner is decreased by 1 Hz in accordance with a signal for decreasing the operation ability Hz. Therefore, an operation ability Hz different from the operation ability obtained based on room temperature and set value is set. This operation ability is used until the time a cancellation signal is received. In case a signal for decreasing the operation ability Hz occurs again, the operation ability Hz is further decreased by 1 Hz.

When the variation of the speed of rotation (synchronous frequency) of the compressor 11 is decreased and particularly when the speed of rotation of the compressor 11 is decreased, the refrigerant pressure (pressure towards the high pressure side) is decreased during the cooling cycle. The speed of pressure decrease greatly depends on resistance of such cooling cycle component devices as the heat exchanger, the pressure reducing device, and the like. Therefore, should the speed of rotation of the compressor be decreased faster than the speed of pressure decrease, an overload current would be supplied to the motor for driving the compressor because the refrigerant pressure in the cooling cycle is served as a load to the compressor, and as a result of which the power consumption is increased on the contrary. For this reason, the speed of rotation of the compressor, namely, the speed for decreasing the frequency Hz is set to 1 Hz/0.5 sec. It should be noted that the speed is not limited to this but it can be appropriately set in accordance with the ability of the compressor.

Accordingly, because the decreasing speed of the frequency (operation ability) Hz does not exceed 1 Hz/0.5 m sec. even in case the signal for decreasing the operation ability is output at intervals of every 100 msec., 200 msec. . . . 500 msec., the actual decreasing speed of operation ability is constant even in case a signal for reducing the operation ability is output a plurality of times.

The currently maintained operation ability of the air conditioner is maintained as it is by maintaining the operation ability Hz. This operation is continue until the time a cancellation signal is received. When a signal for reducing the operation ability Hz occurs, the operation ability Hz is reduced by 1 Hz from this operation ability.

Then, in step S23, the timer for the B-zone is counted. By this counting, the time for the effective value of the current to be present in the B-zone is counted. When the effective value I of the current is judged to be present continuously for 10 sec. in step S24 or when the effective value I of the current is judged to be present cumulatively for 30 sec. in the B-zone in step S25, the process proceeds to step S26 where a restriction signal for making the operation ability Hz of the lower machine to zero (0) (i.e., stop) and another restriction signal for lowering (decreasing) the operation ability Hz of the higher machine are transmitted. Subsequently, in step S27, the timers (including the timer for the B-zone) are all reset and then, the process returns to step S23.

If the conditions in steps S24 and S25 are not satisfied, the process returns to A of FIG. 5 and the effective value I of the current is calculated again in step S11 after a predetermined time. Since the timer for the B-zone is reset after the timer is reset in step S27, the judgments in steps S24 and S25 are not established and so, the process proceeds to A of FIG. 5.

Figure 7:
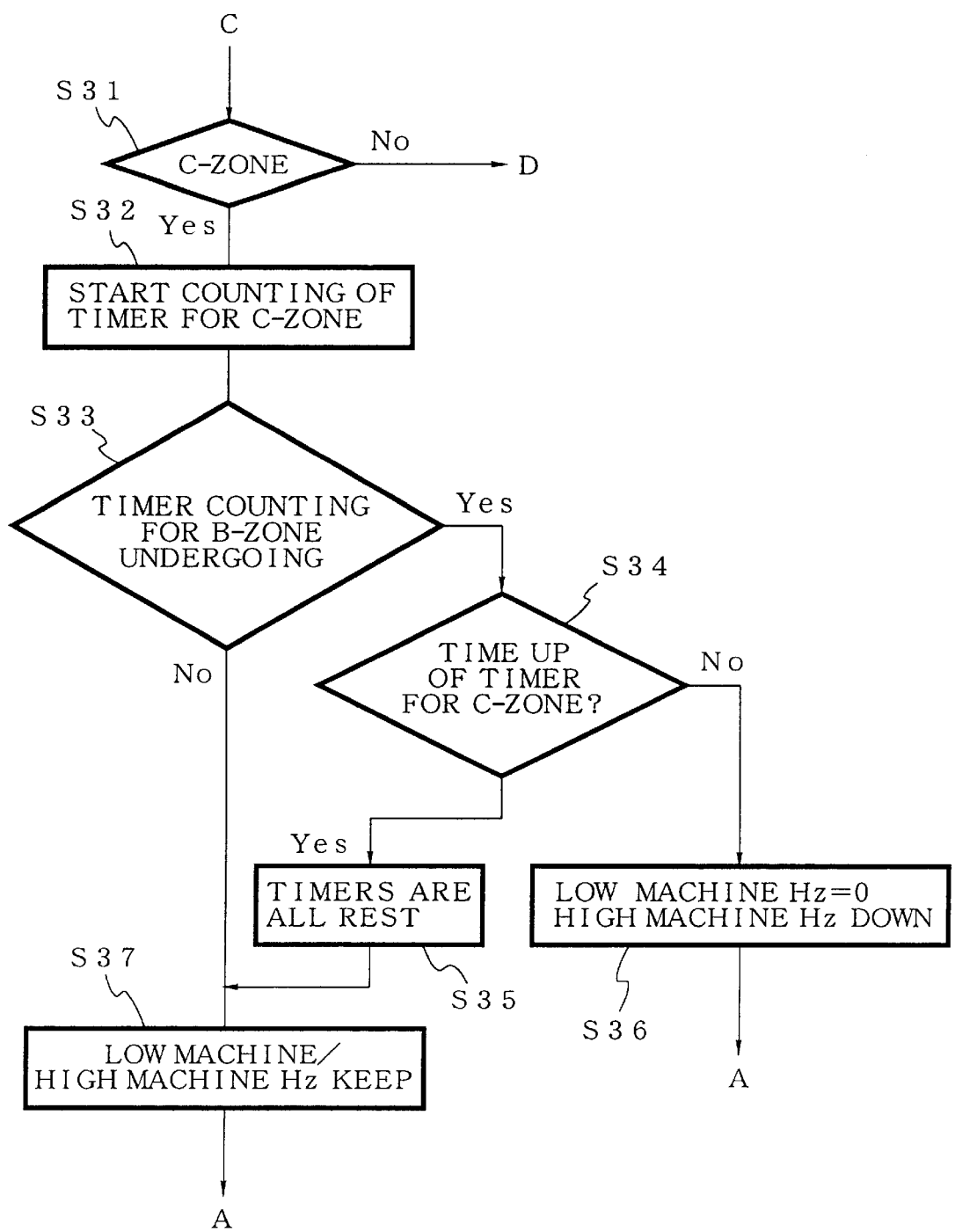
FIG. 7 is a flow chart showing an operation for outputting a restriction signal in accordance with a current flowing to a circuit breaker.

If the effective value I of the current is not present in the B-zone in step S21, the process proceeds to step S31 of FIG. 7 where it is judged whether or not the effective value I of the current is present in the C-zone. If the effective value I is present in the C-zone, the process proceeds to step S33 where it is judged whether or not the timer for the B-zone is in a counting mode. That is, it is judged that the reason why the effective value I of the current electric current is present in the C-zone is attributable to the result in which the effective value I comes down from the B-zone.

If this step S33 is not satisfied (if the effective value I of the current comes up from the D-zone, or if the effective value I is present in the C-zone until the time the timer for the C-zone is timed up), the process proceeds to step S37 where restriction signals for keeping the operation ability Hz of the lower machine and the higher machine are output. After the step S37, the process returns to A of FIG. 5.

If it is judged in step S33 that the counting of the timer for the B-zone is undergoing, the process proceeds to step S34 where it is judged whether or not the counting of the timer for the C-zone is timed up (for example, 180 sec., but it should be noted that the counting is not limited to this but it can be appropriately set in match with other timers). If it is judged that the timer for the C-zone is not timed up, the process proceeds to step S36 where the operation of the lower machine is stopped and the operation ability of the higher machine is downed (control of the B-zone). Thereafter, the process returns to A of FIG. 5 where the effective value I of the current is calculated.

If step S34 is satisfied, the process proceeds to step S35 where the timers are all reset. Then, the process proceeds to step S37.

Therefore, in the flow chart shown in FIG. 7, when the effective value I of the current comes down from the B-zone, the restriction in the B-zone is continued until the timer for the C-zone is timed up, and the restriction in the C-zone is performed after the timer for the C-zone is timed up. Accordingly, in case the effective value I is often moved between the B-zone and the C-zone, the restriction in the B-zone is kept until the time the timer for the C-zone is timed up, thereby preventing a frequent switching operation.

Figure 8:
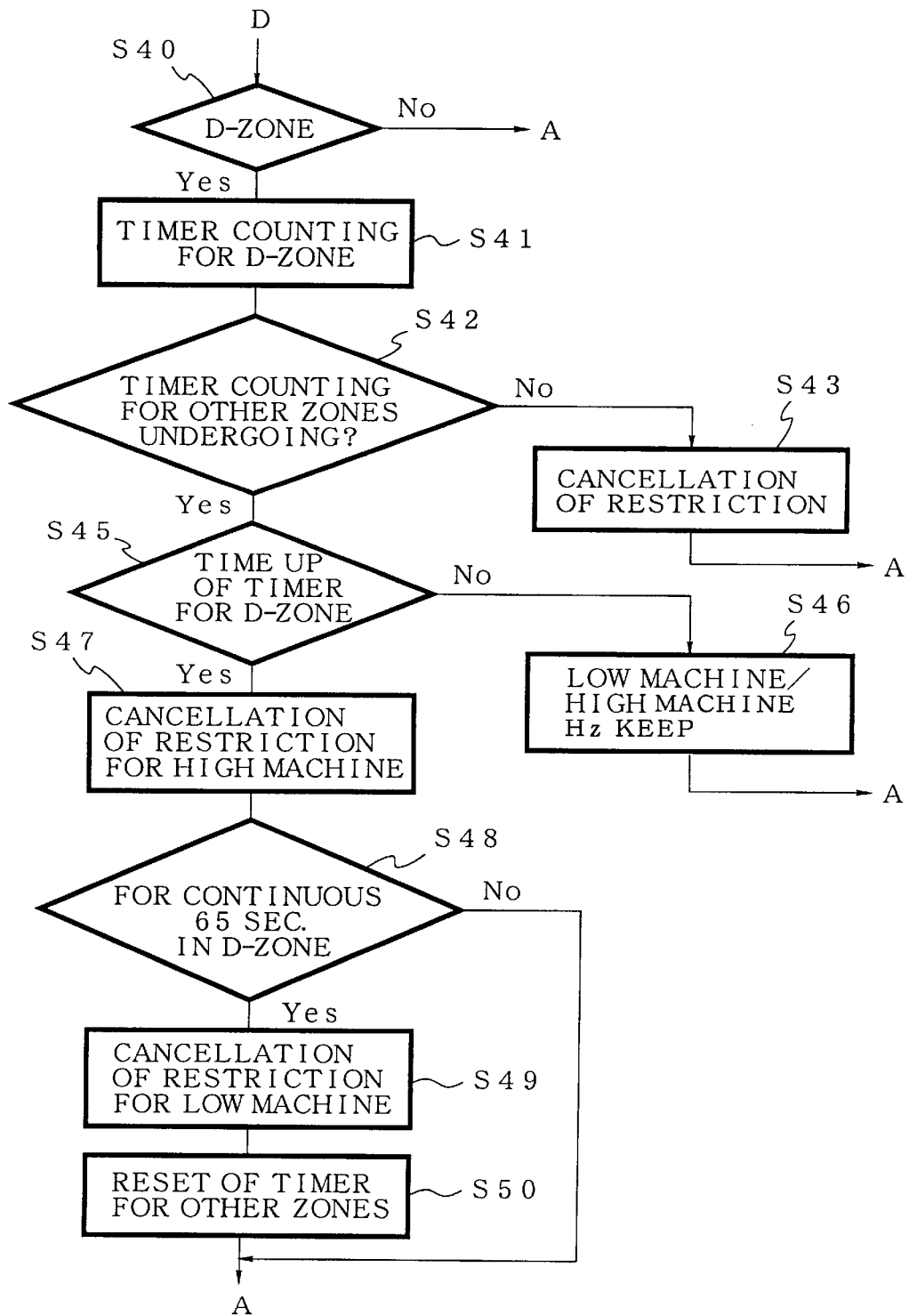
FIG. 8 is a flow chart showing an operation for outputting a restriction signal in accordance with a current flowing to a circuit breaker.

If the effective value I of the current is not present in the C-zone in step S31, the process proceeds to step S40 of FIG. 8 where it is judged whether or not the effective value I of the current is present in the D-zone. If the effective value I is present in the D-zone, the process proceeds to step S41 first, where the timer for the D-zone is counted. Since the zones where the effective value I is present are judged in sequential order from the A-zone, a judgment made in step S40 to the effect that the effective value I is not present in the D-zone possibly indicates that errors (current becomes negative, or the like) may exist in calculation of the effective value I. Therefore, the process returns again to A of FIG. 5 in order to re-calculate the effective value I.

In step S42, it is judged whether or not the timers for other zones (timers for the B-zone and the C-zones) are counting. If the timer for the D-zone is not timed up in step S45, the process proceeds to step S46 where the restriction signals for maintaining the operation ability of the lower machine and the higher machine are output. That is, this is the case where the effective value I of the current comes down from the higher zone and a predetermined time is not yet elapsed from that time. Although the restriction for the C-zone is made in step S46, the restriction for the B-zone may be made when it is judged that the counting of the timer for the B-zone is undergoing.

If the counting of the timers for other zones is not judged in step S42, the process proceeds to step S43 where the signal for canceling the restriction is output to cancel the restriction for operation ability.

If the timer for the D-zone is timed up in step S45, the process proceeds to step S47 where the restriction for the higher machine is canceled. Then, in step S48, it is judged whether or not the effective value I is present continuously for 65 sec. in the D-zone. If the effective value I is present continuously for 65 sec. in the D-zone, the restriction for the lower machine is canceled in step S49. Then, the process proceeds to step S50 where the timers for other zones are reset. Since no time counting of the timers for other zones are made thereafter, the process proceeds from step S42 to step S43 where the restrictions are all canceled.

In this way, by counting the time by providing a timer in each zone, the mode of restrictions are not frequently changed even in case the effective valve I of the current often moves from one zone to another.

The restriction signals thus obtained are transmitted to the child machines (the lower machine and the higher machine). In the child machines, when such restriction signals are received, the LED indicating that the demand is undergoing (the restrictions for the operation ability are undergoing) is turned on and the infrared signal is transmitted to the air conditioner as previously mentioned.

The LED indicating the undergoing of the demand is held in the ON-state until the time the restriction signal is received.

The air conditioner which has received the signal(s) from the child machine(s), controls the operation of the compressor with the operation ability available after a restriction is applied to the operation ability demanded based on the room temperature in the room to be air conditioned and the preset temperature.

Figure 9:
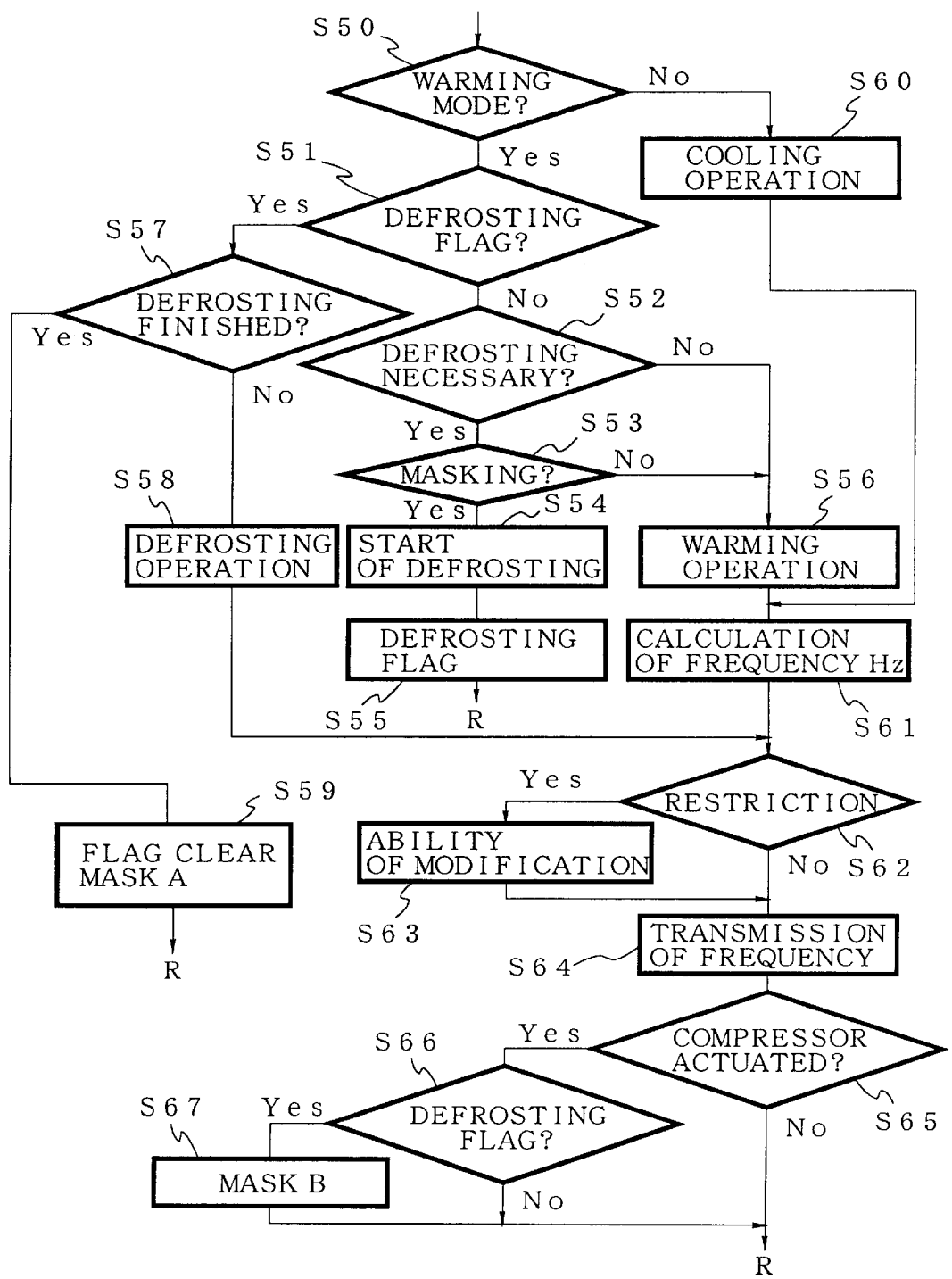
FIG. 9 is a flow chart schematically showing a part of an operation of the air conditioner.

FIG. 9 is a flow chart schematically showing a part of the operation of the air conditioner. In this flow chart, it is judged in step S50 whether or not the air conditioner is in the heating operation mode (heating mode) based on a previous operation. If the judgment result is affirmative, the process proceeds to step S51 where it is further judged whether or not a defrosting flag is present. If the defrosting flag is not present, judgments as to whether or not frost is deposited on the heat source side heat exchanger and a defrosting operation is necessary, and whether a predetermined defrosting masking time is elapsed in steps S52 and S53, respectively. This masking time is A (for example, about 40 minutes and this time is appropriately set depending on the ability of the cooling cycle) in its initial value. If the conditions of steps S52 and S53 are satisfied, the operation mode is shifted to the defrosting operation mode and the defrosting operation is started in step S54. A defrosting flag is set in step S55. Then, after the remaining controlling procedures are executed, the operation of the flow chart is repeated.

If the conditions of steps S52 and S53 are not satisfied, that is, if no defrosting operation is necessary, the process proceeds to step S56 where the warming operation is made.

If the defrosting flag is set in step S51, the process proceeds to step S57 where it is judged whether or not the defrosting operation can be finished in view of a predetermined condition. If the condition of step S57 is not satisfied, the defrosting mode is continued in step S58 and the process then proceeds to step S62.

If the condition of step S57 is satisfied, the process proceeds to step S59 where the defrosting flag is cleared and the masking time is set to A. Then, after the remaining controlling procedure is executed, the operation of the flow chart is repeated.

If the judgment result in step S50 is negative, the cooling operation is made in step S60, and then the operation ability (frequency Hz) of the compressor is calculated in step 61 together with the procedure in step S56.

Then, the process proceeds to step S62 where it is judged whether or not a restriction signal for the operation ability is received. If the judgment is made in the affirmative, a modification is made based on the restriction in step S63. In contrast, if the judgment is made in the negative, the compressor is kept operated with the current frequency in step S64. The modification in step S63 extends not only to the frequency Hz calculated in step S61 but also to the fixed frequency (frequency for the defrosting operation) determined in step S58.

Then, it is judged in step S65 whether or not the compressor is to be actuated. That is, it is judged whether or not the frequency Hz is changed from zero (0). Then, in step S66, it is judged whether not the defrosting flag is present. If the defrosting flag is present, the masking time for defrosting is changed to B (<A), for example, about 20 minutes, in step S67. By making such a controlling operation as just mentioned, the masking time for defrosting can be shortened more than usual after the compressor is actuated again after the compressor is once stopped upon receipt of the restriction signal during the defrosting operation. Thus, the defrosting operation can more easily be continued at the time the compressor is resumed in operation.

Figure 10:
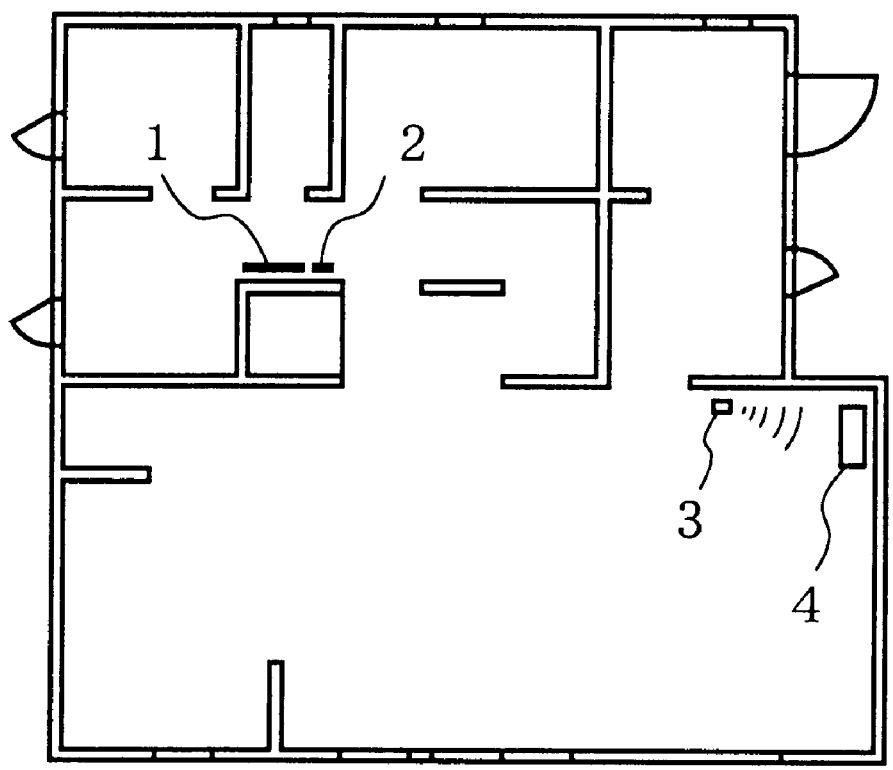
FIG. 10 is an explanatory view showing a specific room arrangement of a circuit breaker, a parent machine, a child machine and an air conditioner.

FIG. 10 is an explanatory view showing a specific indoor arrangement of the circuit breaker 1, the parent machine 2, the child machine 3, and the air conditioner 4. By using radio waves for communication between the parent machine 2 and the child machine 3 as discussed, a restriction signal can be transmitted without any inconvenience even in the event there is a provision of a wall, or the like, between the parent machine 2 and the child machine 3. This can increase the degree of freedom for installation of the parent machine and the child machine.

In the first aspect of the invention, there can be obtained a demand controller type control apparatus without a need of a provision of a signal line.

In the second aspect of the invention, a control can be performed by interrupting into a use signal from the remote controller of the air conditioner without a need of a provision of a signal line.

In the third aspect of the invention, increase in power consumption of the air conditioner can be restrained or reduced and the air conditioning operation can be stopped with the demanding signal which is output in a way to interrupt in the signal from the remote controller.

In the fourth aspect of the invention, in the event the air conditioner is stopped by demanding when a defrosting operation is made, the defrosting operation can more easily be resumed after the air conditioner is resumed in operation. By doing so, the defrosting operation once interrupted by the demand controlling can be restarted.

In the fifth aspect of the invention, a demand controlling apparatus which permits a reliable transmission of a signal to the air conditioner can be obtained.

In the sixth aspect of the invention, an operation state of the air conditioner according to the demand signal can be shifted smoothly to the normal operation state.

In the seventh aspect of the invention, even when the current varies so often from the target current value as a boarder, restrictions are not changed so often, with the result of achieving a stable demand control.

What is claimed is:

1. An apparatus for controlling an air conditioner capable of obtaining power from at least one of a plurality of power delivery lines connected to an individual circuit breaker, said apparatus comprising:

a remote controller operable to transmit an operation signal for controlling the air conditioner using an infrared signal, the infrared signal including an identification code solely for application by the air conditioner and a format A recognizable by the air conditioner;

a demand control unit operable to convert a restriction signal for restricting an electric current flowing to the circuit breaker so as not to exceed a target current value into a radio signal composed of a format B and then transmitting the same;

a restriction signal converter operable to convert the restriction signal transmitted from said demand control unit into the infrared signal and transmitting the same when the restriction signal from said demand control unit is judged to be effective due to a coincidence of the format B; and a control unit, in the air conditioner, operable to perform a modification with respect to the signal from said restriction signal converter in a way to reduce power consumption of the air conditioner by judging the infrared signal transmitted from said remote controller and the infrared signal transmitted from said restriction signal converter both to be effective.

2. An apparatus as claimed in claim 1, further comprising:

a parent machine provided with said demand control unit; and a child machine provided with said restriction signal converter, said parent machine being located in a vicinity of the individual circuit breaker and said child machine being located so as to be capable of receiving a radio signal from said parent machine and so as to be capable to transmit an infrared signal to the air conditioner.

3. A apparatus as claimed in claim 1, wherein:

said demand control unit is operable to convert a cancellation signal to a radio signal composed of a format B and to transmit the same when a current value of the current flowing to the circuit breaker becomes smaller than the target current value after the restriction signal is transmitted as an output;

said restriction signal converter converts the cancellation signal to an infrared signal and transmits the same when the cancellation signal from said demand control unit is judged to be effective due to a coincidence of the format; and said control unit judges that the infrared signal transmitted from said restriction signal converter to be effective and cancels the modification of the operation ability of the air conditioner based on the restriction signal so that the operation mode will return to a normal operation.

4. An apparatus for controlling an air conditioner capable of obtaining power from at least one of a plurality of power delivery lines connected to an individual circuit breaker, and varying an air conditioning ability in accordance with a load of a room to be air conditioned, said apparatus comprising:

a remote controller operable to transmit an operation signal for controlling the air conditioner using an infrared signal, the infrared signal including an identification code solely for application by the air conditioner and a format A recognizable by the air conditioner;

a demand control unit operable to convert a first restriction signal when current flowing to the circuit breaker exceeds a first target current value but does not exceed a second target current value, convert a second restriction signal when the current exceeds the second target current value but does not exceed a third target current value, and convert a third restriction signal when the current exceeds the third target current value, respectively, into radio signals each composed of a format B and then transmitting the same;

a restriction signal converter operable to convert the first to third restriction signals transmitted from said demand control unit respectively into the infrared signals and transmitting the same when the first to third restriction signals from said demand control unit are judged to be effective due to a coincidence of the format B; and a control unit operable to perform a modification with respect to the first restriction signal from said restriction signal converter in a way to restrain an increase of power consumption of the air conditioner by restraining an increase of air conditioning ability of the air conditioner, performing a modification with respect the second restriction signal from said restriction signal converter in a way to reduce power consumption of the air conditioner by decreasing air conditioning ability of the air conditioner, and performing a modification with respect to the third restriction signal from said restriction signal converter in a way to reduce power consumption of the air conditioner by stopping air conditioning operation of the air conditioner.

5. An apparatus as claimed in claim 4, wherein when a current value of the current flowing to the circuit breaker varies so as to drift at the second target current value, the operation ability of the air conditioner is maintained in the modified state based on the second restriction signal, and when the current value of the current flowing to the circuit breaker varies so as to drift at the first target current value, the operation ability of the air conditioner is maintained in the modified state based on the first restriction signal.

6. An apparatus as claimed in claim 4, further comprising:
a parent machine provided with said demand control unit; and
a child machine provided with said restriction signal converter, said parent machine being located in a vicinity of the individual circuit breaker and said child machine being located so as to be capable of receiving a radio signal from said parent machine and so as to be capable of transmitting an infrared signal to the air conditioner.

7. A apparatus as claimed in claim 4, wherein:
said demand control unit is operable to convert a cancellation signal to a radio signal composed of a predetermined format and to transmit the same when a current value of the current flowing to the circuit breaker becomes smaller than the first target current value after the restriction signal is output;

said restriction signal converter converts the cancellation signal to an infrared signal and transmits the same when the cancellation signal from said demand control unit is judged to be effective due to a coincidence of the format; and said control unit judges that the infrared signal transmitted from said restriction signal converter to be effective and cancels the modification of the operation ability of the air conditioner based on the restriction signal so that the operation mode will return to a normal operation.

8. An apparatus for controlling an air conditioner capable of obtaining power from at least one of a plurality of power delivery lines connected to an individual circuit breaker, performing cooling/heating/defrosting operations, and varying an air conditioning ability in accordance with a load of a room to be air conditioned, said apparatus comprising:

a remote controller operable to transmit an operation signal for controlling the air conditioner using an infrared signal, the infrared signal including an identification code solely for application by the air conditioner and a format A recognizable by the air conditioner;

a demand control unit operable to convert a first restriction signal when current flowing to the circuit breaker exceeds a first target current value but does not exceed a second target current value, convert a second restriction signal when the current exceeds the second target current value but does not exceed a third target current value, and convert a third restriction signal when the current exceeds the third target current value, respectively, into radio signals each composed of a format B and then transmitting the same;

a restriction signal converter operable to convert the first to third restriction signals transmitted from said demand control unit respectively into the infrared signals and transmitting the same when the first to third restriction signals from said demand control unit are judged to be effective due to a coincidence of the format B;

a control unit operable to perform a modification with respect to the first restriction signal from said restriction signal converter in a way to restrain an increase of power consumption of the air conditioner by restraining an increase of air conditioning ability of the air conditioner, performing a modification with respect the second restriction signal from said restriction signal converter in a way to reduce power consumption of the air conditioner by decreasing air conditioning ability of the air conditioner, and performing a modification with respect to the third restriction signal from said restriction signal converter in a way to reduce power consumption of the air conditioner by stopping air conditioning operation of the air conditioner; and a defrost modification unit operable to modify conditions of a start of a defrosting operation so that the air conditioner can easily resume a defrosting operation at the time of resuming an operation of the air conditioner when the air conditioner has stopped the defrosting operation based on one of the first to third restriction signals.

9. An apparatus as claimed in claim 8, further comprising:
a parent machine provided with said demand control unit; and
a child machine provided with said restriction signal converter, said parent machine being located in a vicinity of the individual circuit breaker and said child machine being located so as to be capable of receiving a radio signal from said parent machine and so as to be capable to transmit an infrared signal to the air conditioner.

10. A apparatus as claimed in claim 8, wherein:

said demand control unit is operable to convert a cancellation signal to a radio signal composed of a predetermined format and to transmit the same when a current value of the current flowing to the circuit breaker becomes smaller than the first target current value after the restriction signal is output;

said restriction signal converter converts the cancellation signal to an infrared signal and transmits the same when the cancellation signal from said demand control unit is judged to be effective due to a coincidence of the format; and said control unit judges that the infrared signal transmitted from said restriction signal converter to be effective and cancels the modification of the operation ability of the air conditioner based on the restriction signal so that the operation mode will return to a normal operation.

11. An apparatus as claimed in claim 8, wherein when a current value of the current flowing to the circuit breaker varies so as to drift at the second target current value, the operation ability of the air conditioner is maintained in the modified state based on the second restriction signal, and when the current value of the current flowing to the circuit breaker varies so as to drift at the first target current value, the operation ability of the air conditioner is maintained in the modified state based on the first restriction signal.

* * * * *